(No Model.)
M. C. HARGRAVE.
Hame Hook.
No. 232,960. Patented Oct. 5, 1880.
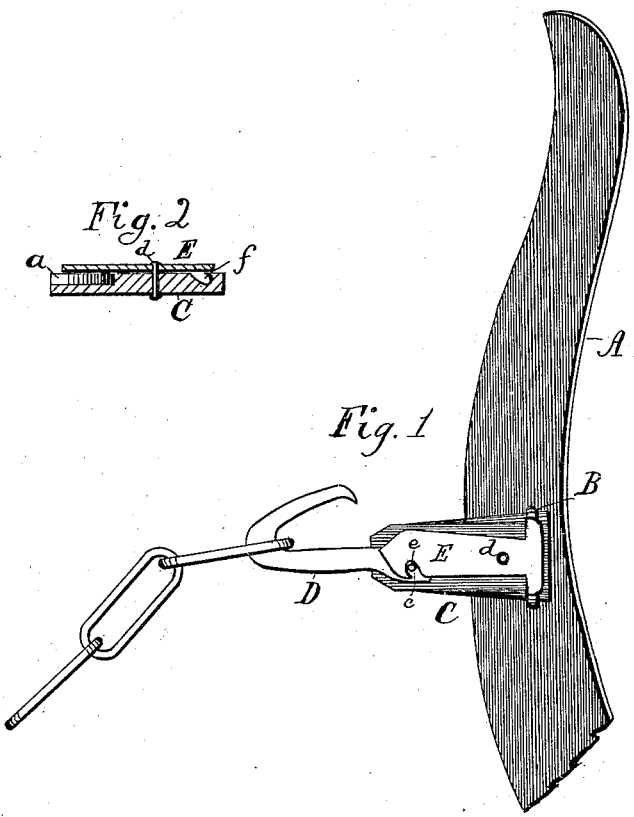
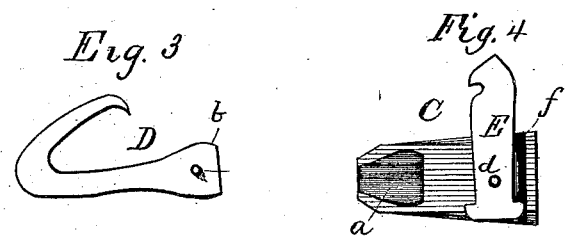
WITNESSES:
A. B. Brown
Edw. W. Byrn
INVENTOR:
M. C. Hargrave.
BY
ATTORNEYS.

United States Patent Office.

MOSES C. HARGRAVE, OF WILMINGTON, N. C., ASSIGNOR OF ONE-HALF OF HIS RIGHT TO JOHN GEVERT LOUIS GIESCHEN, OF SAME PLACE.

HAME-HOOK.

SPECIFICATION forming part of Letters Patent No. 232,960, dated October 5, 1880.

Application filed August 23, 1880. (No model.)

*To all whom it may concern:*

Be it known that I, MOSES CALVIN HARGRAVE, of Wilmington, in the county of New Hanover and State of North Carolina, have invented a new and Improved Hame-Hook; and I do hereby declare that the following is a full, clear, and exact description of the same, reference being had to the accompanying drawings, forming part of this specification, in which—

Figure 1 is a side view, showing the relation of the hook to the hame and tug-chain. Fig. 2 is a longitudinal section of the butt portion of the hinge. Fig. 3 is a detail of the detachable hook end, and Fig. 4 is a side view of the butt portion with the fastening-plate thrown back.

My invention relates to certain improvements in hame-hooks designed to permit the worn end of the hook to be renewed and replaced by another without trouble or delay; and it consists in the peculiar construction of the hook formed in detachable parts, as hereinafter fully described.

In the drawings, A represents a portion of one of the hames, to which is permanently attached the long staple B. C D is the sectional hame-hook, composed of the butt portion C, which is connected with the staple, and the hook portion D, which is detachably connected to the butt portion.

I make the butt portion C with a recess, $a$, in its outer side, running out at the rear end, while the hook portion D, I form with an enlarged end, $b$, adapted to fit snugly in this recess. For securely retaining this enlarged end in this recess said enlarged end is provided with an outwardly-projecting stud or pin, $c$, while upon the outer surface of the butt portion D is riveted loosely upon a center, $d$, a rotary locking-plate, E, which has a curved slot, $e$, that hooks over the stud $c$, while the plate itself holds the enlarged end of the hooked portion down in its recess. For connecting the butt portion of the hook to the staple said butt portion is made with a groove, $f$, crosswise the same at its end, into which the staple is received, and the rotary locking-plate E is extended beyond its fulcrum, so as to lap over this groove and retain the staple in the same. This, it will be seen, permits the hook to be secured to the butt and the butt to the staple by the same movement and the same device. The forward side of the groove $f$ should be slightly undercut, so as to cause the staple to draw in when the draft is applied, instead of passing out and straining the plate. The slot $e$ in the rotary locking-plate should also be inclined back at its upper end, so that the draft strain will have a tendency to hold this locking-plate more firmly down to its position.

With the construction described it will be seen that when the hook-section is worn out or broken another can be inserted without delay, without the use of tools, and by unskilled persons while the team is still attached to the vehicle or gear.

Having thus described my invention, what I claim as new is—

1. The combination of a butt portion, C, having a recess, $a$, the hook portion D, having enlarged end fitting in said recess and provided with a stud, and a slotted rotary locking-plate riveted to the butt portion, substantially as described.

2. The combination of the butt portion C, having recess $a$ and transverse groove $f$, the hook D, having enlarged end and stud $c$, and the rotary locking-plate E, extended upon each side of its fulcrum and adapted to secure both the hook-section and the staple of the hame, as set forth.

MOSES CALVIN HARGRAVE.

Witnesses:
JOHN H. THEES,
J. A. THEES.